(12) United States Patent
Hatae

(10) Patent No.: US 6,271,981 B1
(45) Date of Patent: *Aug. 7, 2001

(54) DETECTION DEVICE AND METHOD FOR DETECTING PILOT SIGNAL COMPONENT FROM DIGITAL SIGNAL AS WELL AS REPRODUCING APPARATUS

(75) Inventor: Shinichi Hatae, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,000

(22) Filed: Oct. 3, 1997

Related U.S. Application Data

(63) Continuation of application No. 08/440,893, filed on May 15, 1995, now abandoned.

(30) Foreign Application Priority Data

| May 25, 1994 | (JP) | 6-111027 |
| May 25, 1994 | (JP) | 6-111029 |
| May 25, 1994 | (JP) | 6-111030 |
| May 25, 1994 | (JP) | 6-111031 |

(51) Int. Cl.$^7$ .............. G11B 5/584; G11B 5/09
(52) U.S. Cl. .............. 360/77.14; 360/46
(58) Field of Search ............... 360/32, 46, 51, 360/77.14, 77.15; 386/40

(56) References Cited

U.S. PATENT DOCUMENTS

| 5,251,079 | 10/1993 | Yamada et al. | 360/77.14 |
| 5,258,879 | 11/1993 | Shimotashiro et al. | 360/77.14 |
| 5,359,473 | 10/1994 | Kaniwa et al. | 360/77.14 |
| 5,455,813 | 10/1995 | Hayashi | 360/51 |
| 5,854,714 | * 12/1998 | Reed et al. | 360/51 |

FOREIGN PATENT DOCUMENTS

| 0339724 | 11/1989 | (EP) . |
| 0343726 | 11/1989 | (EP) . |
| 0472375 | 2/1992 | (EP) . |

OTHER PUBLICATIONS

IEEE Transactions On Consumer Electronics, vol. 39, No.4, Nov. 1993, New York, pp. 711–721, A.M.A. Rijckaert, et al., "An Experimental Digital Consumer HDTV Recorder Using MC–DCT Video Compression".

Patent Abstracts of Japan No. JP–A–60 151817, vol. 9, No. 327 (P–415), published Dec. 21, 1985.

* cited by examiner

Primary Examiner—Regina Y. Neal
(74) Attorney, Agent, or Firm—Robin, Blecker & Daley

(57) ABSTRACT

A signal detecting device for detecting a pilot signal component from a modulated digital signal which contains information data and the pilot signal component, comprises a digital converter for performing bit-quantization of the modulated digital signal, a detector for detecting the pilot signal component and a restoring circuit for restoring the information data, the detector and the restoring circuit both using an output of the converter. The detecting device is digital throughout since the pilot signal component is detected by using an output of the digital converter.

15 Claims, 15 Drawing Sheets

US 6,271,981 B1

DETECTION DEVICE AND METHOD FOR DETECTING PILOT SIGNAL COMPONENT FROM DIGITAL SIGNAL AS WELL AS REPRODUCING APPARATUS

This is a continuation application under 37 CFR 1.62 of prior application Ser. No. 08/440,893, filed May 15, 1995, now abandoned.

BACKGROUND OF THE INVENTION

1. Field of the Invention

The present invention relates to a signal detecting device, a signal detecting method and a signal reproducing apparatus and, more particularly, to a detection device and method for detecting a pilot signal component from a modulated digital signal which contains information data and the pilot signal component, as well as to a signal reproducing apparatus arranged to perform tracking control by using such detection method.

2. Description of the Related Art

In recent years, with the advance of digital magnetic recording/reproduction technology, intensive development of digital VTRs have been carried out. In the field of the digital VTRs, various tracking control methods have been proposed because it is still necessary to perform tracking control during reproduction in the digital VTRs similarly to conventional analog VTRs.

One noticeable method includes the step of multiplexing a predetermined pilot signal component before a digital signal data stream to be recorded is digitally modulated and performing tracking control during reproduction by using the predetermined pilot signal component.

FIG. 1 is a block diagram schematically showing the construction of a recording system for a digital VTR which uses this kind of tracking control method. As shown in FIG. 1, rotary heads ch1 and ch2 are fixed to a rotary drum (not shown) with a phase difference of 180° so that a modulated digital signal can be recorded on a magnetic tape T which is a recording medium.

The operation of the recording system will be described below.

A video signal which has been inputted from a terminal 1 is supplied to a digital recording-signal processing circuit 2. The digital recording-signal processing circuit 2 encodes the video signal into highly efficiently coded data and subjects the data to error-correcting encoding, thereby forming a digital data stream containing audio data and other auxiliary data in accordance with a recording data format.

This digital data stream is supplied to a digital modulation.pilot signal addition circuit 3. The digital modulation-.pilot signal addition circuit 3 subjects digital modulation for adding redundancy to data, such as 24–25 conversion, to the data stream supplied from the digital recording-signal processing circuit 2, and adds pilot signal components to the modulated digital data stream by using the redundancy.

Specifically, for example, a leading bit "1" or "0" is added to the leading part of each 24-bit data to form two kinds of 25-bit data, and these two kinds of 25-bit data are outputted as bit streams, respectively. Then, these bit streams are individually subjected to NRZI modulation. Then, a DC component, a component f1 (the frequency of a first pilot signal) and a component f2 (the frequency of a second pilot signal) are extracted from each of the two kinds of NRZI-modulated bit streams, and the sum of these components is calculated. The sum is added to the accumulated value of the past sums, whereby accumulated values are formed for the respective bit streams. Then, these two kinds of accumulated values are compared with each other, and a bit stream of 25 bits which yields the smaller accumulated value is selected and outputted. The bit stream outputted in this case is a bit stream in which the DC component and the components f1 and f2 are individually suppressed.

If a predetermined pattern signal is multiplexed with (for example, subtracted from) the extracted DC component, the aforesaid bit stream will have a frequency component relative to the predetermined pattern signal. Therefore, if the frequency of the predetermined pattern signal is set to the desired one of the frequency f1 and f2, a pilot signal component of desired frequency can be multiplexed with the modulated digital bit stream.

For example, if the bit rate of each bit stream is defined as fb; the frequency f1 of the first pilot signal as fb/90; and the frequency f2 of the second pilot signal as fb/120, a pattern signal which repeats its pattern at intervals of a 90- or 120-bit period can be subtracted from each of the two kinds of detected DC components. Thus, the pilot signal component of the desired frequency f1 or f2 can be multiplexed with the modulated digital bit stream.

The thus-obtained modulated digital bit streams are supplied to a switching circuit 4 as modulated digital recording signals, and are alternately supplied to the rotary heads ch1 and ch2 by head switching pulses (HSW) formed in accordance with the rotational phases of the respective rotary heads ch1 and ch2. The rotary heads ch1 and ch2 rotate with a phase difference of 180° to alternately trace the magnetic tape T, thereby recording the modulated digital recording signals while sequentially forming a multiplicity of parallel helical tracks.

FIG. 2 shows one example of a recording pattern formed on the magnetic tape T. As shown, the first and second pilot signals are multiplexed on every other track from among the multiplicity of helical tracks formed in the above-described manner, whereby the first pilot signal of frequency f1 and the second pilot signal of frequency f2 are respectively multiplexed at intervals of a 4-track period in such a manner that the first and second pilot signals are alternately recorded on every other track. This recording pattern is formed, for example, by alternately subtracting the pattern signals having the frequency components f1 and f2 from the aforesaid DC component during every period in which the magnetic head ch1 makes a recording, and inhibiting either of the pattern signals from being subtracted from the DC component during every period in which the magnetic head ch2 makes a recording.

FIG. 3 is a block diagram showing one example of the construction of a conventional reproducing system for reproducing from the magnetic tape T the modulated digital recording signals recorded in the recording format shown in FIG. 2.

The modulated signals which have been alternately reproduced by the magnetic heads ch1 and ch2 are inputted to a head switching circuit 9 through reproducing amplifiers 7 and 8, respectively. The head switching circuit 9 is switched by the head switching pulse HSW supplied from a drum-rotation detecting circuit 15, whereby the modulated signals which have been alternately supplied from the magnetic heads ch1 and ch2 are formed into a continuous reproduced signal. This continuous reproduced signal is inputted to a digital reproduced-signal processing circuit 10, an f1 detecting circuit 12 and an f2 detecting circuit 13. The digital reproduced-signal processing circuit 10 performs predetermined kinds of precessing such as digital demodulation processing, error-correcting processing and decoding of highly efficiently coded data, and outputs the restored information data (video data) to an output terminal 11.

Each of the f1 detecting circuit 12 and the f2 detecting circuit 13 is formed by an analog band-pass filter and the like. The pilot signal components respectively extracted by the f1 and f2 detecting circuits 12 and 13 are supplied to a tracking control circuit 16. The tracking control circuit 16 detects the levels of the pilot signal components outputted from the respective circuits 12 and 13 and finds a difference between the detected levels. If tracking control is performed so that the magnetic head ch2 can reproduce the recorded tracks formed by the magnetic head ch2 itself, the magnetic head ch2 traces the tracks on which no pilot signals are multiplexed. Each time the magnetic head ch2 traces one of such tracks, the components f1 and f2 are obtained from both adjacent tracks. At this time, by finding a difference between the pilot signal components f1 and f2, it is possible to obtain a signal indicative of tracking error as to the magnetic head ch2. Incidentally, while the magnetic head ch1 is tracing, since no tracking-error signal is obtained, the tracking control circuit 16 samples and holds the immediately previous tracking-error signal. Also, since the polarity of the tracking-error signal reverses at intervals of a 2-track period, the aforesaid difference value is correspondingly reversed in polarity in synchronism with the head switching pulse HSW.

The thus-obtained tracking control signal is supplied to a capstan control circuit 17, and the capstan control circuit 17 controls the transport of the magnetic tape T so that each of the magnetic heads ch1 and ch2 can trace a desired track.

However, this conventional kind of apparatus has a number of disadvantages. One disadvantage is that analog band-pass filters are used to detect the respective pilot signals. External analog circuits must be especially provided in a digital VTR which is substantially made up of digital processing circuits, and a large space for installation of constituent components is needed in the digital VTR. Another disadvantage is that since higher harmonic components are produced by detecting circuits provided at the rear stages of the respective band-pass filters, low-pass filters or the like must be provided for eliminating these higher harmonic components. This disadvantage makes it difficult to achieve an efficient circuit arrangement.

SUMMARY OF THE INVENTION

It is, therefore, an object of the present invention to solve the above-described problems.

Another object of the present invention is to provide a detection device and method capable of digitally detecting a pilot signal multiplexed with a modulated digital signal, as well as a reproducing apparatus capable of performing good tracking control by using such a detection device and method.

To achieve the above objects, in accordance with one aspect of the present invention, there is provided a device for detecting a pilot signal component from a modulated digital signal which contains information data and the pilot signal component, which device includes digital converting means for performing bit-quantizing conversion of the modulated digital signal, restoring means for restoring the information data by using an output of the digital converting means and detecting means for detecting a pilot signal component by using the output of the digital converting means.

There is provided another arrangement which includes digital converting means for performing bit-quantizing conversion of the modulated digital signal in accordance with a clock synchronized with a reproduced modulated digital signal and detecting means for detecting the pilot signal component by using the output of the digital converting means.

With the above-described arrangements, it is possible to accurately detect the pilot signal component contained in the modulated digital signal without using an analog circuit, and it is also possible to digitize all circuits that constitute a reproducing apparatus, thereby reducing the size of the entire reproducing apparatus to a great extent.

Another object of the present invention is to provide a detection device and method capable of detecting a pilot signal multiplexed with the aforesaid modulated digital signal, by a circuit of comparatively small scale and low power consumption, as well as a reproducing apparatus capable of performing good tracking control by using such a detection device and method.

To achieve the above object, in accordance with another aspect of the present invention, there is provided an arrangement which reduces the rate of extraction of data from an A/D-converted output.

Still another object of the present invention is to provide a reproducing apparatus capable of digitally detecting a pilot signal multiplexed with the aforesaid modulated digital signal, and made up of circuits a large part of which can be prepared as software.

To achieve the above object, in accordance with another aspect of the present invention, there is provided an arrangemnt capable of sampling the value of a detected pilot signal component in synchronism with a clock having a frequency corresponding to an operating frequency of the reproducing apparatus.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
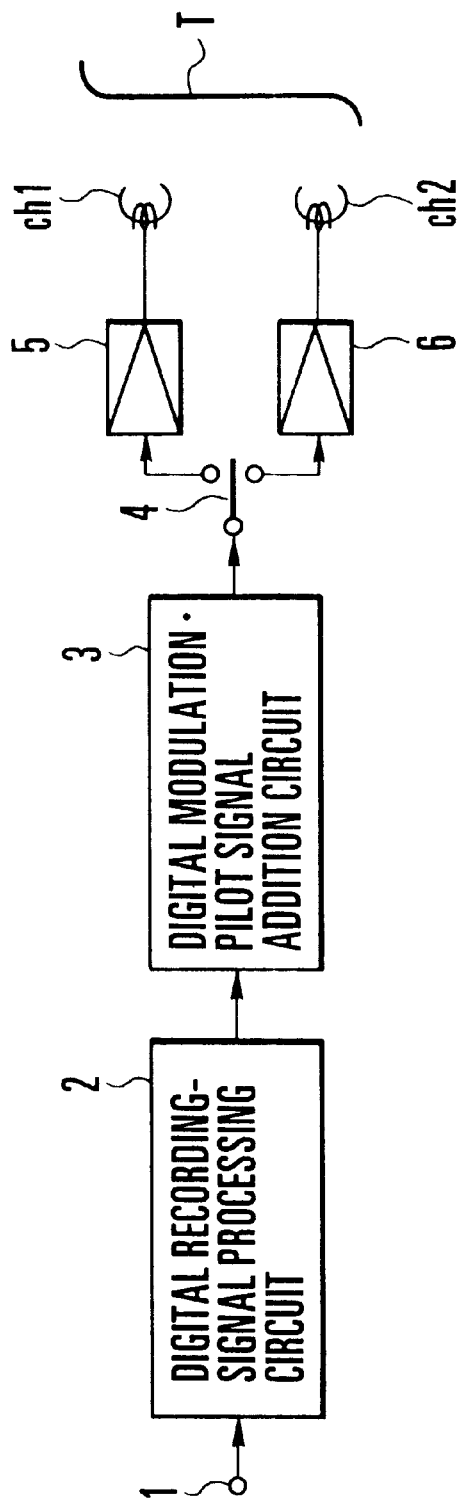
FIG. 1 is a block diagram schematically showing the construction of a recording system for a conventional digital VTR.
Figure 2:
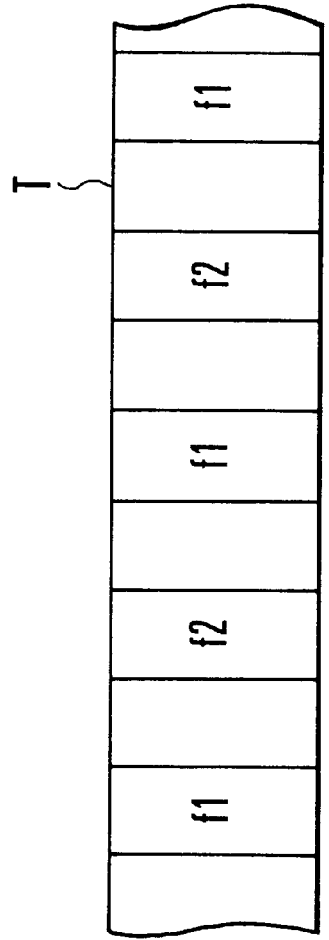
FIG. 2 is a schematic view showing a recording pattern formed on a magnetic tape by the digital VTR shown in FIG. 1.
Figure 4:
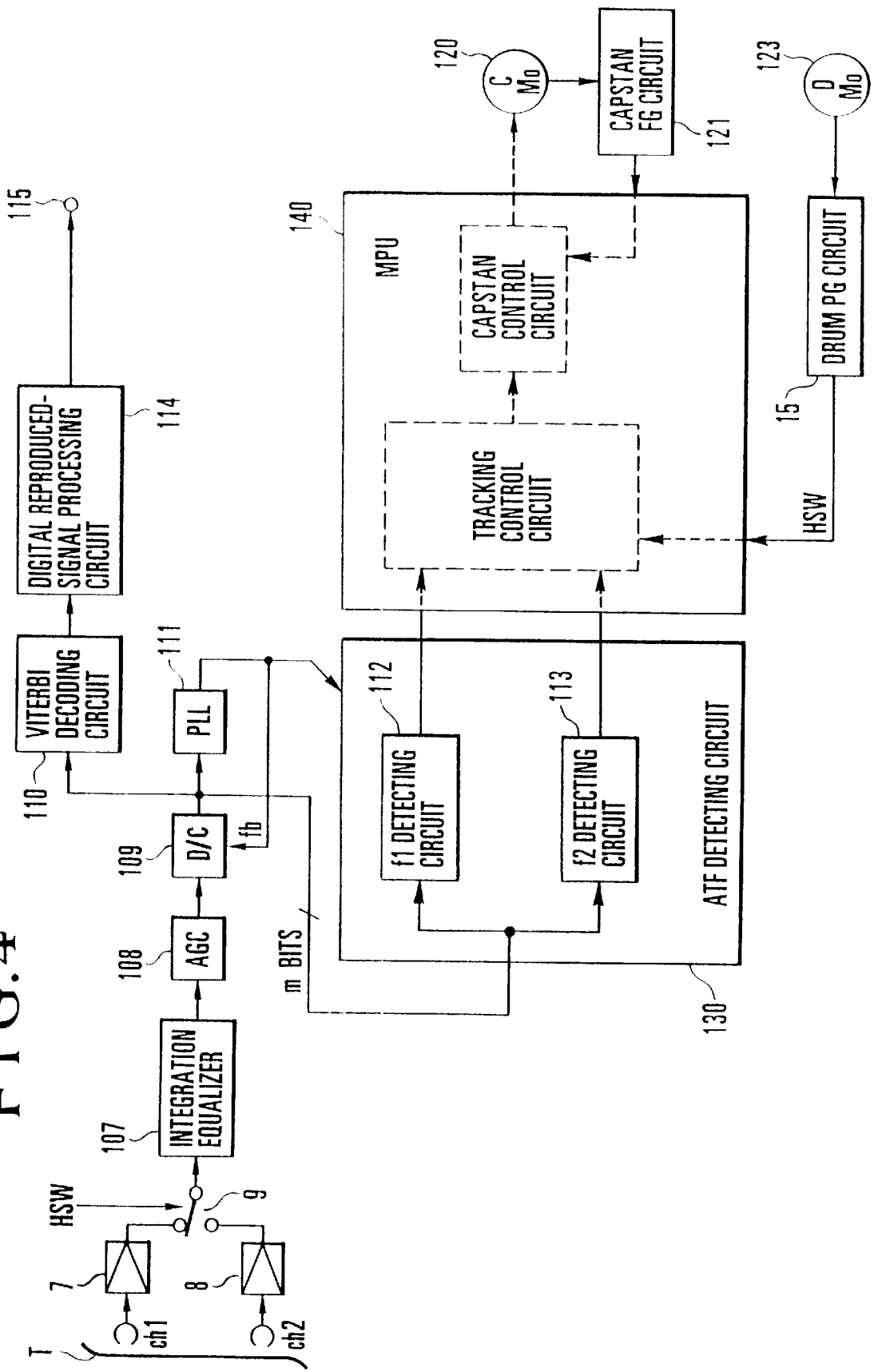
FIG. 4 is a block diagram schematically showing the entire construction of the reproducing system of a digital VTR according to a first embodiment of the present invention.

FIG. 4 is a block diagram schematically showing the construction of the reproducing system of a digital VTR according to a first embodiment of the present invention. A digital VTR according to the first embodiment is arranged to reproduce from a magnetic tape T a video signal recorded as shown in FIG. 2 by the recording device described above with reference to FIG. 1.

Figure 3:
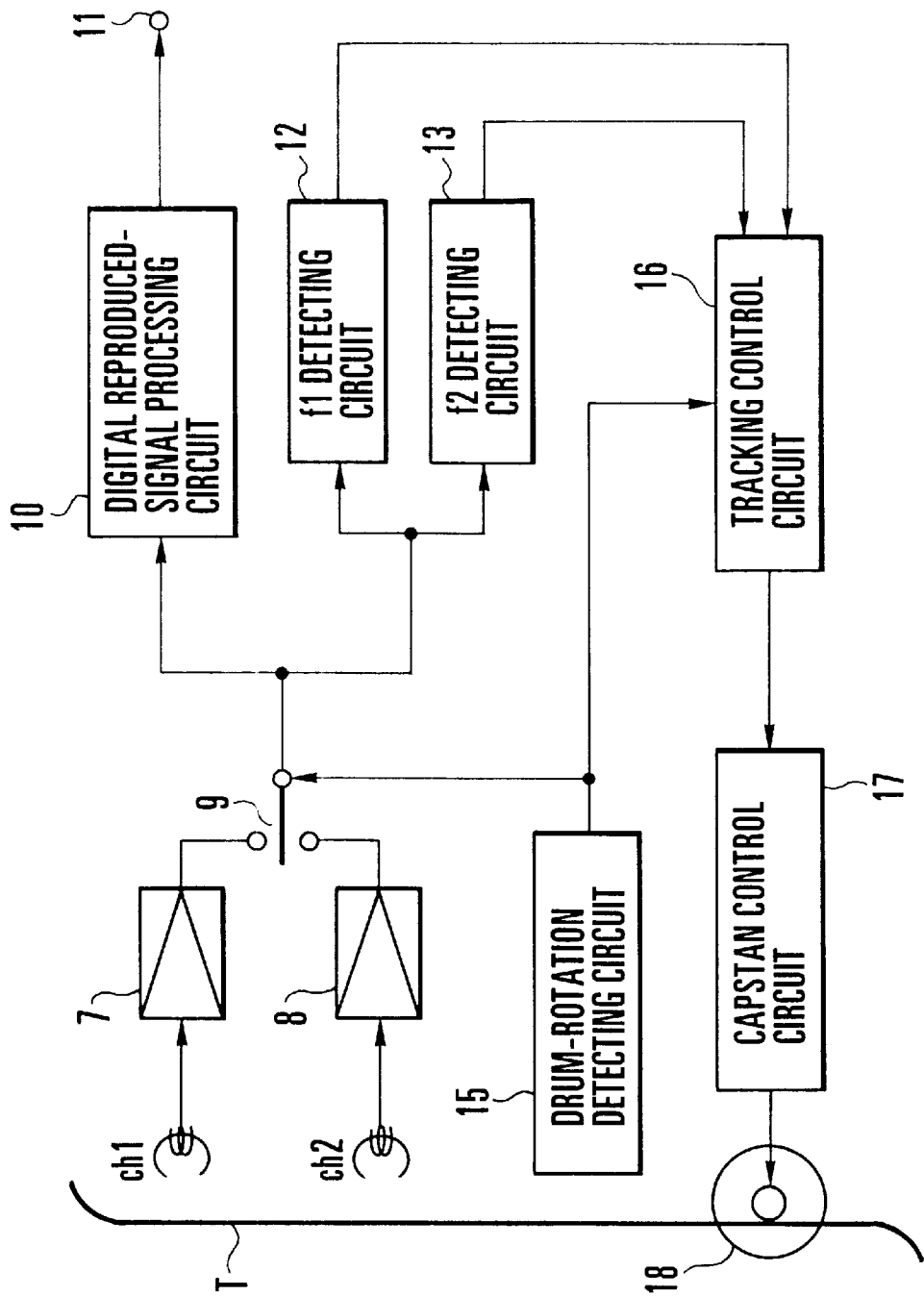
FIG. 3 is a block diagram schematically showing one example of the construction of the reproducing system of a digital VTR for reproducing the recording pattern shown in FIG. 2.

In FIG. 4, identical reference numerals are used to denote constituent elements identical to those shown in FIG. 3. The output (modulated digital signal) from the head switching circuit 9 is supplied to an integration equalizer 107. The integration equalizer 107 performs integration equalization to adjust the phase and amplitude characteristics of the reproduced signal to cosine rolloff characteristics, because the recording signal is convoluted with a transfer function determined by electromagnetic conversion with the result that the phase and amplitude characteristics of the reproduced signal are varied. The output from the integration equalizer 107 is supplied to an AGC (automatic gain control) circuit 108, in which the amplitude of the reproduced signal is adjusted to a predetermined amplitude value.

The reproduced modulated signal outputted from the AGC circuit 108 is inputted to a digital converter (D/C) 109, in which it is sampled and quantized in accordance with clocks formed by a PLL circuit 111 which will be described later. The converter 109 performs quantizing at m bits per sample (m is an integer of 2 or more) and outputs m-bit digital data. When a Viterbi decoding circuit 110 which is provided at the rear stage of the converter 109 is taken into consideration, it is preferable that the converter 109 perform quantizing at at least about 6 bits per sample. The m-bit digital data is supplied to the PLL circuit 111, and the PLL circuit 111 generates a clock signal synchronized with the reproduced modulated signal, by using the m-bit digital data. If the bit rate of each bit stream is fb as described previously, the frequency of this clock signal also becomes fb.

The m-bit modulated signal discretely quantized by the converter 109 is decoded into a bit stream by the Viterbi decoding circuit 110. This bit stream is supplied to a digital reproduced-signal processing circuit 114, in which the bit stream is digitally demodulated into data consisting of 24 bits per word. The digital reproduced-signal processing circuit 114 further performs predetermined kinds of processing such as error-correcting processing and highly efficient decoding, thereby restoring the original information data (video data). The restored information data is outputted from a terminal 115.

In the meantime, the m-bit modulated signal outputted from the converter 109 is also inputted to both an f1 detecting circuit 112 and an f2 detecting circuit 113 of an ATF detecting circuit 130. The f1 and f2 detecting circuits 112 and 113 respectively digitally extract and detect the components f1 and f2 from the quantized, reproduced modulated signal and input, as data, the components f1 and f2 to a microprocessor unit (MPU) 140 provided at the rear stage of the ATF detecting circuit 130.

The MPU 140 performs functions corresponding to a tracking control circuit and a capstan control circuit as shown by dashed lines in FIG. 4, thereby controlling the rotation of a capstan motor 120. The speed of rotation of the capstan motor 120 is detected by a capstan FG circuit 121, and the capstan FG circuit 121 outputs an FG pulse of frequency corresponding to the speed of rotation of a capstan (not shown). The speed of rotation of a drum motor 123 which rotates a rotary drum provided with the rotary magnetic heads ch1 and ch2 is also detected by the drum PG circuit 15. The drum PG circuit 15 outputs a PG pulse when the rotary drum reaches a particular phase, for example, two PG pulses for one rotation. The FG pulse and the PG pulse which are respectively outputted from the capstan FG circuit 121 and the drum PG circuit 15 are inputted to the MPU 140.

Figure 5:
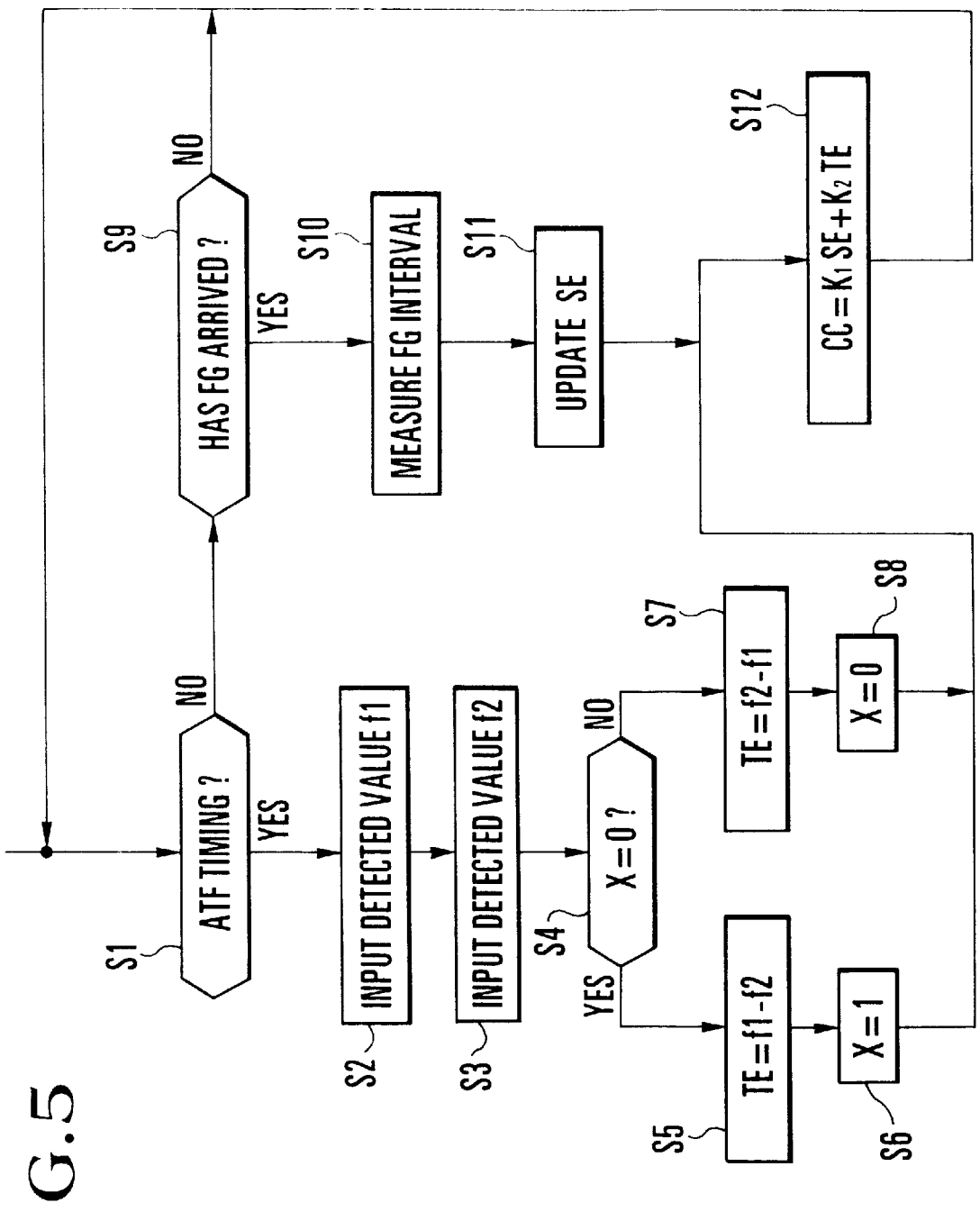
FIG. 5 is a flowchart showing the operation of the MPU shown in the reproducing system shown in FIG. 4.

FIG. 5 is a flowchart showing the operation of the MPU 140. The tracking control operation of the first embodiment will be described below with reference to the flowchart.

Tracking control is achieved by comparing the components f1 and f2 reproduced when the magnetic head ch2 is placed in its reproducing state, as described previously. For example, in the MPU 140, each time the magnetic heads ch1 and ch2 make one rotation, ATF timing occurs and a tracking error signal is formed. Specifically, in Step S1 of FIG. 5, the MPU 140 detects whether the ATF timing has arrived, on the basis of the elapsed time after a PG pulse has been inputted into the MPU 140. If the ATF timing is detected, the values of the detected components f1 and f2 are inputted into the MPU 140 in Steps S2 and S3, respectively.

In Step S4, it is determined whether an internal variable X is "0". The internal variable X alternately repeats "1" and "0" each time the ATF timing arrives, and is used to reverse the polarity of a tracking-error signal. The reason why the internal variable X is prepared is that each time the rotary drum makes one rotation, the directions from which the pilot signals f1 and f2 are respectively generated are reversed with respect to a tracking target track mainly traced by the magnetic head ch1. If the internal variable X is "0", the process proceeds to Step S5, in which tracking-error data TE is obtained from f1 (the value of the detected component f1)−f2 (the value of the detected component f2). If the internal variable X is "1", the process proceeds to Step S7, in which the tracking-error data TE is obtained from f2 (the value of the detected component f2)−f1 (the value of the detected component f1). Then, in Steps S6 or S8, the internal variable X is switched to the opposite value in preparation for the next detection. Then, after capstan control data (CC) is updated in Step S12, the process returns to Step S1.

If no ATF timing is detected in Step S1, the process proceeds to Step S9, in which it is determined whether a capstan FG pulse has arrived. If the capstan FG pulse arrives, the process proceeds to Step S10, in which the period (interval) between the capstan FG pulse and the immediate previous capstan FG pulse is measured. In Step S11, capstan speed control data (SE) is updated to adjust this interval to a predetermined period of time. Then, in Step S12, the capstan control data CC is updated. Although integration processing which corresponds to a so-called low-pass filter to be used in an analog circuit is in practice inserted for updating the capstan speed control data SE or the tracking-error data TE, the step of such integration processing is omitted from this flowchart for the sake of simplicity. In Step S12, the updated capstan speed control data SE and the tracking-error data TE are respectively multiplied by predetermined coefficients $K_1$ and $K_2$, and both products are added together to obtain the capstan control data CC. The capstan control data CC is outputted from the MPU 140 as a control signal to be supplied to the capstan motor 120.

Figure 6:
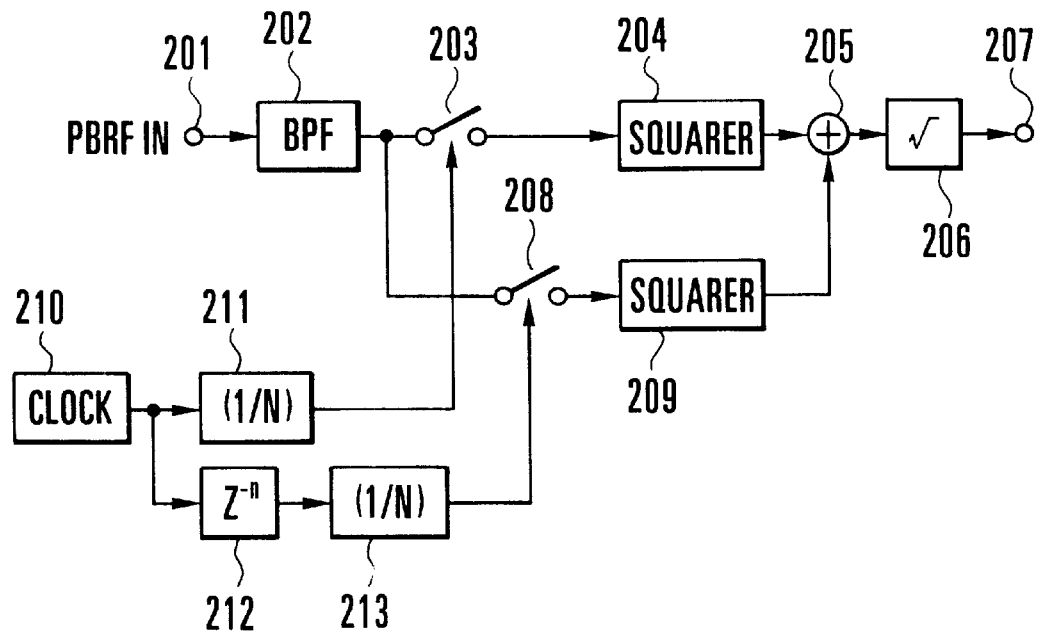
FIG. 6 is a block diagram schematically showing the construction of the pilot-signal detecting circuit used in the reproducing system shown in FIG. 4.

A specific example of the construction of each of the f1 detecting circuit 112 and the f2 detecting circuit 113 shown in FIG. 4 will be described below. FIG. 6 is a block diagram schematically showing one example of the construction of a digital detecting circuit which can be used as the f1 or f2 detecting circuit 112 or 113.

Figure 8A:
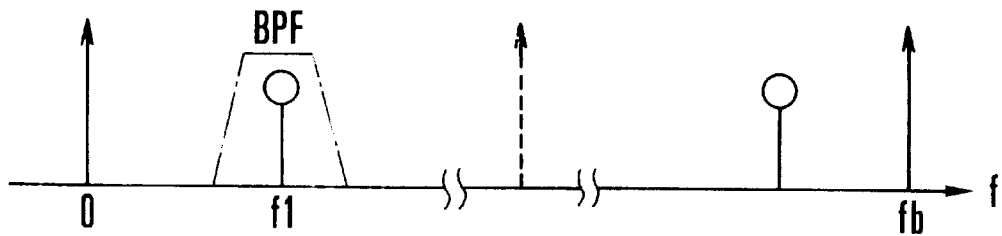
FIGS. 8(A) and 8(B) are views showing the frequency bands of signals used in various parts of the pilot-signal detecting circuit shown in FIG. 6.

Referring to FIG. 6, a reproduced modulated signal which has been quantized at m bits per sample in the above-described manner is inputted to a digital band-pass filter (BPF) 202 through an input terminal 201. The BPF 202 extracts only a component of frequency f1 from the reproduced modulated signal as shown in FIG. 8(A). The reproduced modulated signal from which unwanted noise and the spectrum of the modulated digital bit stream data have been eliminated in this manner is inputted to decimating circuits 203 and 208. Each of the decimating circuits 203 and 208 performs the processing of decreasing a sampling rate in the signal processing system, i.e., the processing of subsampling a particular signal from a digital signal stream. This processing is equivalent to the subsampling of digital data.

If the circuit shown in FIG. 6 is to be used for detecting the component f1, for example, a subsampling frequency for decimation is set to f1. For this purpose, the clock of frequency fb outputted from the PLL circuit 111 is inputted from a clock generating circuit 210 and is then frequency-divided into a clock of frequency f1 by a 1/N frequency dividing circuit 211. If f1=fb/90 as described previously, the frequency-division ratio of the 1/N frequency dividing circuit 211 is 1/90.

In the meantime, the clock of frequency fb inputted from the clock generating circuit 210 is supplied to a delay unit 212. The clock of frequency fb is delayed by a ¼ period of the frequency f1 (fb/90) by the delay unit 212, and a frequency divider 213 divides the frequency of the delayed clock by 90 to output a frequency-divided clock of frequency f1. Accordingly, the operational phases of the decimating circuits 203 and 208 differ from each other by the ¼ period of the frequency f1.

Figure 8B:
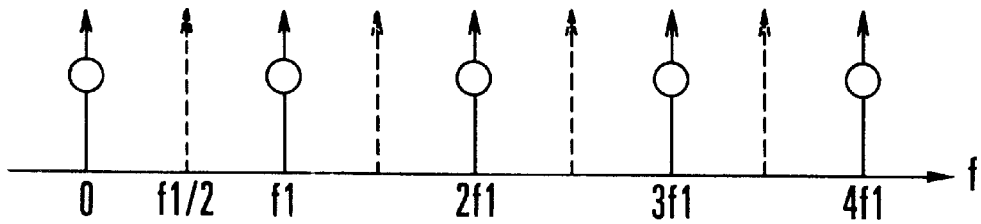

In the first embodiment, resampling (subsampling) is performed so that the Nyquist frequency can be made f1/2 as described previously. In the case of resampling the pilot signal f1 at the frequency f1, if the sampling timing is offset from the peak value of the pilot signal f1 by a phase difference equal to a ¼ period of the frequency f1, a resampled output, i.e., a decimated output, may become completely "0". For this reason, in the first embodiment, by decimating the input pilot signal f1 by using phases having an orthogonal relationship (90°-shifted phases), spectra are detected in the form of being respectively folded at intervals of periods which are integer multiples of DC and f1, as shown in FIG. 8(B).

In this manner, by obtaining the magnitude of a vector by performing decimation using clocks with an orthogonal relationship, it is possible to obtain the amplitude of a particular frequency component of the input signal. Accordingly, one of the decimated signals is squared by a squaring circuit 204, while the other is squared by a squaring circuit 209. The outputs of the squaring circuits 204 and 209 are added together by an adding circuit 205, and the sum output of the adding circuit 205 is inputted to a square rooter 206. The square rooter 206 extracts a square root of the output of the adding circuit 205, thereby finding the magnitude of the vector of the signal component f1. The output of the square rooter 206 is inputted to the MPU 140 through a terminal 207 as f1 value data.

In the above-described manner, the decimating circuits 203 and 208 as well as the following circuits are operated in synchronism with the frequency-divided clocks for decimation. Accordingly, no special circuit such as a low-pass filter is needed.

The above description refers to the arrangement in which the circuit shown in FIG. 6 is used for detecting the pilot signal f1. However, if the frequency-division ratio is changed to form a clock of frequency f2, it is, of course, possible to use the circuit of FIG. 6 for detecting the pilot signal f2.

Figure 7:
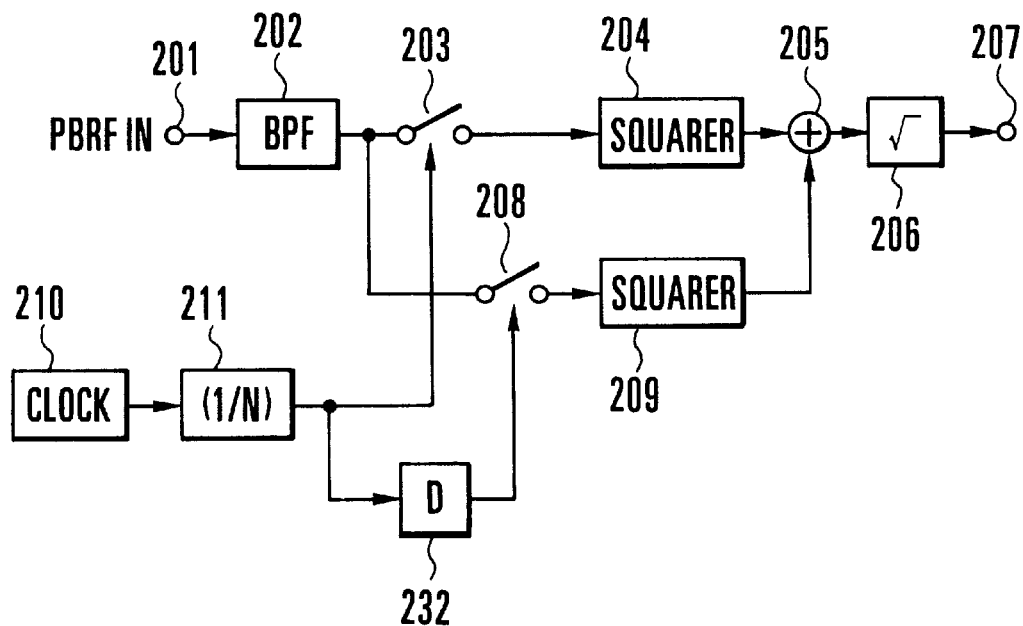
FIG. 7 is a block diagram schematically showing the construction of a pilot-signal detecting circuit for use in the reproducing system shown in FIG. 4 according to one modification of the first embodiment.

FIG. 7 is a block diagram schematically showing another specific example of the construction of the f1 or f2 detecting circuit 112 or 113 according to one modification of the first embodiment. In FIG. 7, identical reference numerals are used to denote constituent elements identical to those shown in FIG. 6. In the example shown in FIG. 7, the 1/N frequency dividing circuit 211 is a 1/90 frequency divider if the circuit shown in FIG. 7 is to be used for detecting the pilot signal f1. The 1/N frequency dividing circuit 211 frequency-divides a clock of frequency fb supplied from the clock generating circuit 210 and forms a clock of frequency f1. The output of the 1/N frequency dividing circuit 211 is supplied to the decimating circuit 203 as an operating clock. The output of the 1/N frequency dividing circuit 211 is also supplied to a delay circuit 232, in which it is delayed by a ¼ period of the frequency f1. The output of the delay circuit 232 is supplied to the decimating circuit 208 as an operating clock. The other operations are similar to those of the example shown in FIG. 6.

As described above, in the circuit of FIG. 7 as well, it is possible to digitally detect pilot signals, such as f1 and f2, similarly to the circuit of FIG. 6. In addition, the number of frequency dividing circuits in the circuit of FIG. 7 is reduced by one compared to the circuit of FIG. 6, and the circuit of FIG. 7 can produce two kinds of clocks by using one frequency dividing circuit.

Figure 9:
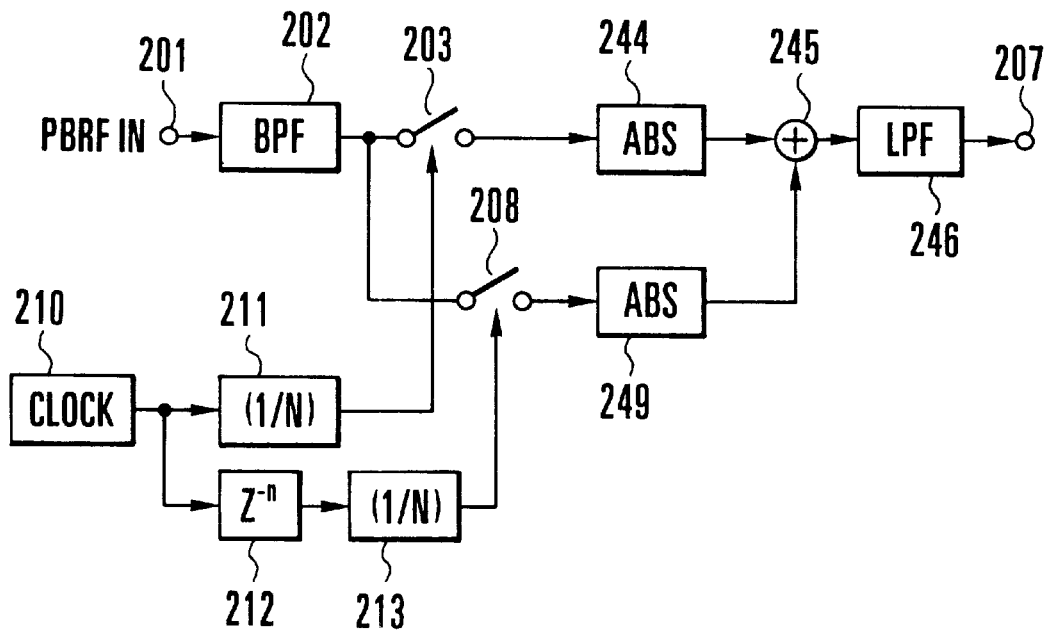
FIG. 9 is a block diagram schematically showing the construction of a pilot-signal detecting circuit for use in the reproducing system shown in FIG. 4 according to another modification of the first embodiment.

FIG. 9 is a block diagram schematically showing a specific example of the construction of the f1 or f2 detecting circuit 112 or 113 according to another modification of the first embodiment. In FIG. 9, identical reference numerals are used to denote constituent elements identical to those shown in FIG. 6. In the example shown in FIG. 9, absolute-value detecting circuits (ABS) 244 and 249 are provided for detecting the absolute values of the outputs of the respective decimating circuits 203 and 208 and outputting the detected absolute values to an addition circuit 245 provided at the rear stage of them. In the addition circuit 245, both absolute values are added together so that the pilot signal component f1 or f2 is extracted as a DC component. The output of the addition circuit 245 is passed through the digital low-pass filter 246 to eliminate noise, and is then supplied to the terminal 207. In the shown circuit, the digital low-pass filter 246 may be omitted for the purpose of a further cost reduction, except when it is necessary to obtain a DC component with a higher S/N ratio.

As is apparent from the above description, according to the first embodiment, it is possible to construct a pilot-signal detecting device and a tracking control device both of which can be completely composed of digital circuits and are capable of executing nearly all processings by means of an MPU. In addition, since no analog circuit is employed, it is possible to reduce the practical size of the entire apparatus and also to improve the compatability of the apparatus with other digital equipment.

In the first embodiment, it is possible to alter, as required, a frequency-division ratio for decimation, the number of bits per sample at which a modulated digital signal is quantized, a clock generating method and the like.

As is also apparent from the above description, according to the first embodiment as well as the aforementioned modifications, there is provided an arrangement in which a modulated digital signal is to obtain a bit-quantizing digital output and not only is information data restored from the digital output but also a pilot signal component is detected from the digital output. Accordingly, it is possible to accurately detect the pilot signal multiplexed with the modulated digital signal by using only a digital signal processing circuit, without newly adding an A/D converter.

According to one of the modifications of the first embodiment, there is provided an arrangement which includes digital converting means for performing bit-quantizing conversion of a modulated digital signal in synchronism with a clock synchronized with reproduced-modulated-signal information data and detecting means for detecting a pilot signal component by using an output of the digital converting means. Accordingly, it is possible to accurately detect the pilot signal component contained in the modulated digital signal without using an analog circuit, and all circuits that constitute the reproducing apparatus can be digitized, thereby reducing the size of the entire reproducing apparatus to a great extent.

Although the subsampling frequency is set to f1 in each of the first embodiment and the modifications, the subsampling frequency can generally be set to f1/M (M is an integer of 2 or more) which is a frequency lower than f1.

For this reason, the clock of frequency fb outputted from the PLL circuit 111 is inputted through the clock generating circuit 210 and frequency-divided by the 1/N frequency dividing circuit 211, thereby producing a clock of frequency f1/M. If f1=fb/90 as described previously, the frequency-division ratio of the 1/N frequency dividing circuit 211 is 1/(90×M).

In the meantime, the clock of frequency fb from the clock generating circuit 210 is also supplied to the delay unit 212, and the delay unit 212 delays the clock by a ¼ period of the frequency f1 (=fb/90). The delayed clock is frequency-divided by (90×M) in the frequency divider 213 so that a frequency-divided clock of frequency f1/M can be outputted. Accordingly, the operational phases of the decimating circuits 203 and 208 differ from each other by the ¼ period of the frequency f1.

Figure 10A:
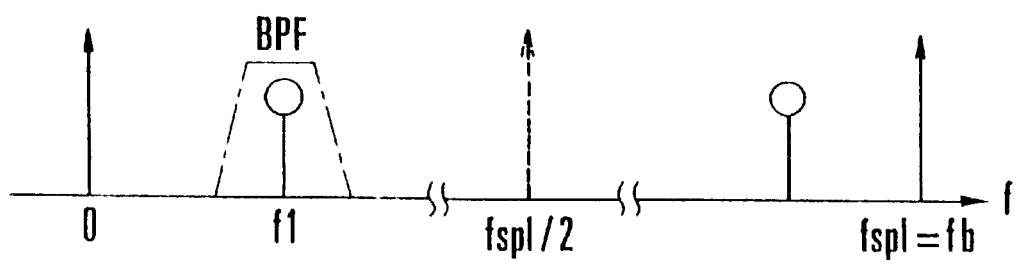
FIGS. 10(A) and 10(B) are views showing the frequency bands of signals used in the modification shown in FIG. 6.
Figure 10B:
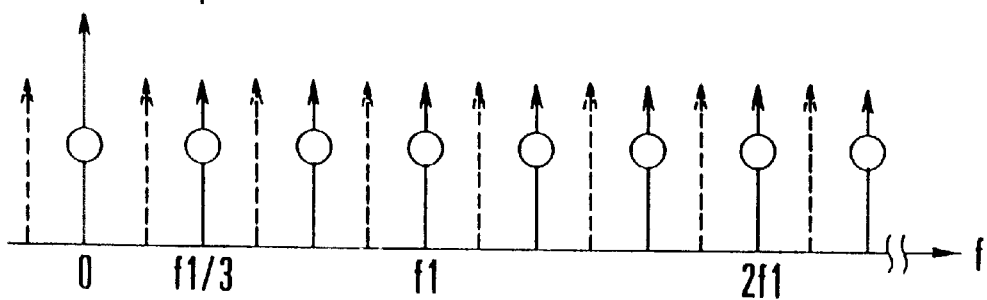

In the case of such a modification, as shown in FIG. 10(B), assuming that M=3, spectra are detected in the form of being respectively folded at intervals of periods which are integer multiples of DC and f1/3, as shown in FIG. 10(B).

Figure 11:
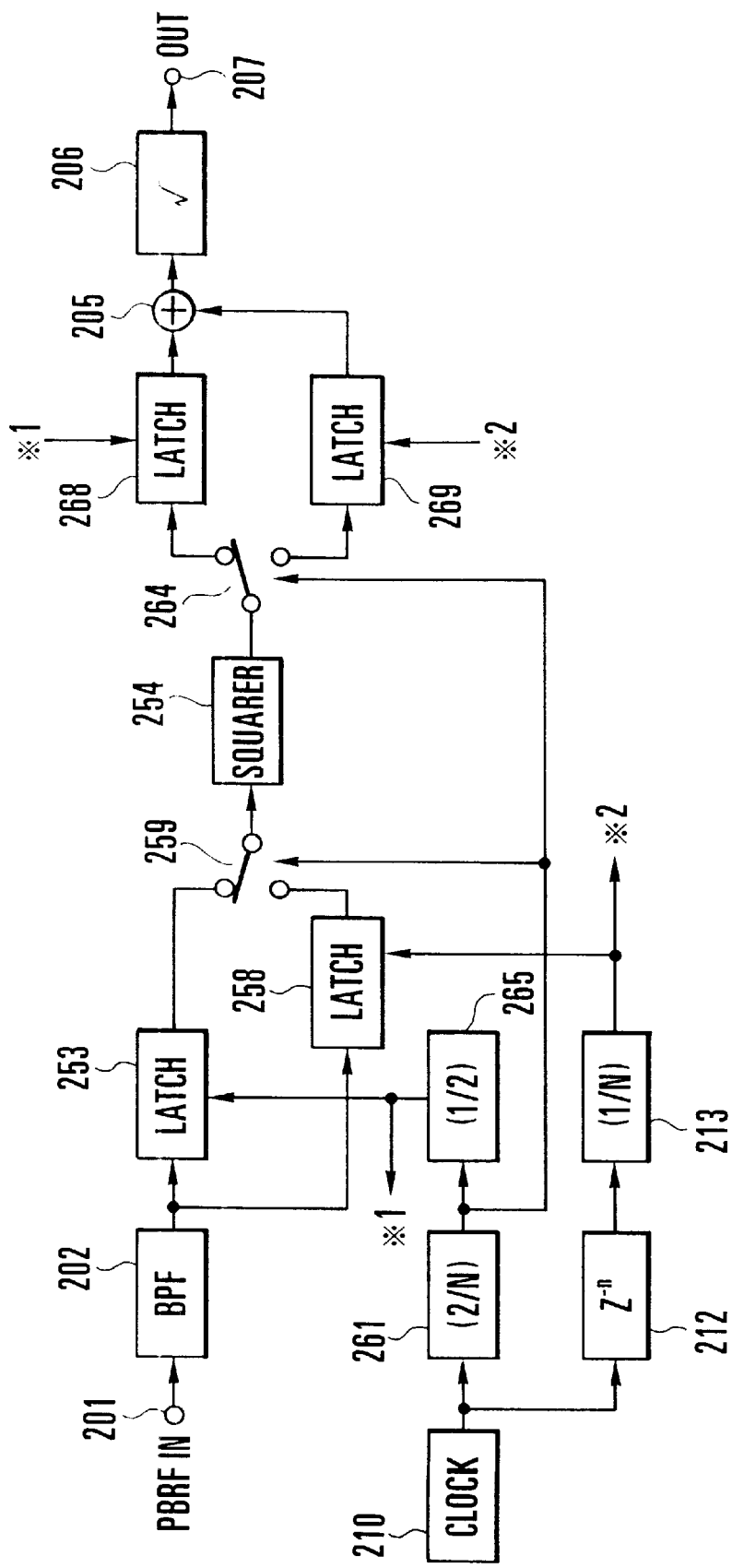
FIG. 11 is a block diagram schematically showing the construction of a pilot-signal detecting circuit for use in the reproducing system shown in FIG. 4 according to another modification of the first embodiment.

FIG. 11 is a block diagram schematically showing one example of the construction of a digital detecting circuit which can be used as the f1 and f2 detecting circuits 112 and 113 of FIG. 4 according to another modification of the first embodiment. In FIG. 11, identical reference numerals are used to denote constituent elements identical to those shown in FIG. 6.

Referring to FIG. 11, a reproduced modulated signal which has been quantized at m bits per sample in the previously-described manner is inputted to the digital band-pass filter (BPF) 202 through the input terminal 201. The BPF 202 extracts only a component of frequency f1 from the reproduced modulated signal as shown in FIG. 8(A). The reproduced modulated signal from which unwanted noise and the spectrum of the modulated digital bit stream data have been eliminated in this manner is inputted to latch circuits 253 and 258 which are decimating means. The term "decimation" used herein represents the processing of decreasing a sampling rate in the signal processing system, i.e., the processing of subsampling a particular signal from a digital signal stream. This processing is equivalent to the subsampling of digital data.

The clock of frequency fb outputted from the PLL circuit 111 is inputted from the clock generating circuit 210 and is then frequency-divided into a clock of frequency 2fb/N which is two times the frequency f1, by a 2/N frequency dividing circuit 261. The clock of frequency 2fb/N is frequency-divided into a clock of frequency f1 (fb/N) by a ½ frequency dividing circuit 265. In the example shown in FIG. 11, since the circuit of FIG. 4 is used for detecting the pilot signal component f1, a latch frequency for decimation is set to f1. If f1=fb/90 as described previously, the frequency-division ratio of the 1/N frequency dividing circuit 261 is 1/45.

In the meantime, the clock of frequency fb inputted from the clock generating circuit 210 is supplied to the delay unit 212. The clock of frequency fb is delayed by a ¼ period of the frequency f1 (fb/90) by the delay unit 212, and the frequency divider 213 divides the frequency of the delayed clock by 90 to output a frequency-divided clock of frequency f1. Accordingly, the operational phases of the decimating circuits 253 and 258 differ from each other by the ¼ period of the frequency f1.

Since the latch circuits 253 and 258 perform decimation using clocks with an orthogonal relationship in the above-described manner, it is possible to obtain the amplitude of a particular frequency component of the input signal. However, it is impossible to obtain the magnitude of a vector, because, in the case of a simply decimated state, a plus or minus sign remains which is determined by the timing between the input pilot signal and the latch operation of each of the latch circuits 253 and 258.

For this reason, the outputs of the latch circuits 253 and 258 are switched by a switch 259 in synchronism with clocks supplied from the 2/N frequency dividing circuit 261, and the output of the switch 259 is inputted to a square detecting circuit 254. The output component of each of the latch circuits 253 and 258 which is outputted from the square detecting circuit 254 is similarly switched by a switch 264 in synchronism with the clocks supplied from the 2/N frequency dividing circuit 261, and is supplied to a respective one of latch circuits 268 and 269. The output component of each of the latch circuits 253 and 258 is inputted to the adder 205 through a respective one of latch circuits 268 and 269 which respectively operate in fsynchronism with clocks supplied from the ½ frequency dividing circuit 265 and the frequency divider 213. Thus, the squares of the components latched by the respective latch circuits 253 and 258 are added together by the adder 205, and the sum output of the adder 205 is inputted to the square rooter 206. The square rooter 206 extracts a square root of the output of the adder 205, thereby finding the magnitude of the vector of the signal component f1. The output of the square rooter 206 is inputted to the MPU 140 through the terminal 207 as f1 value data.

With the above-described arrangement, one squaring circuit, which has a comparatively large circuit scale, can be applied to pilot signal components latched (decimated) in two different phases. Accordingly, it is possible to make the entire circuit scale comparatively small.

The above-described arrangement is used for detecting the pilot signal f1. However, if the frequency-division ratio is changed to form a clock of frequency f2, it is, of course, possible to use the arrangement for detecting the pilot signal f2.

Figure 12:
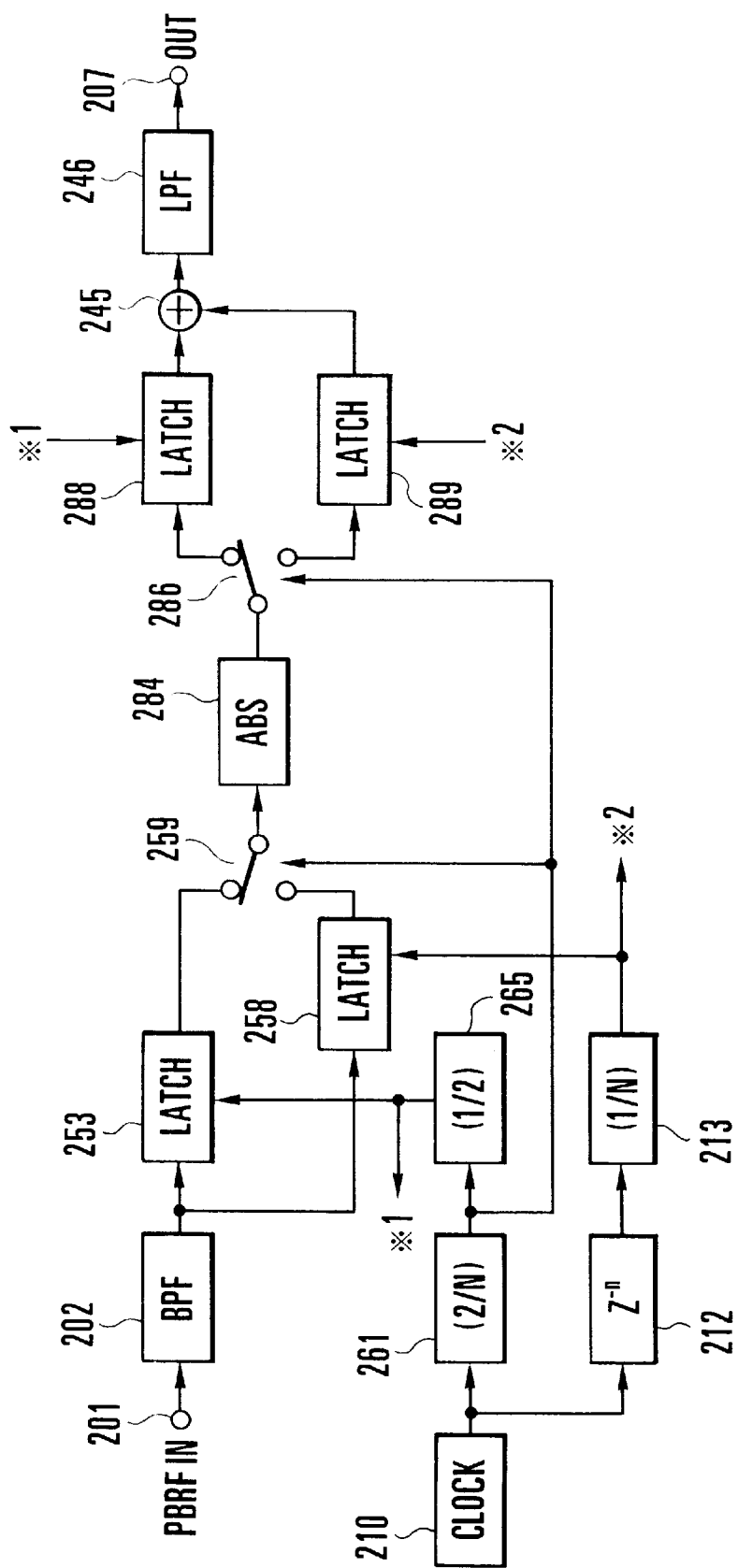
FIG. 12 is a block diagram schematically showing the construction of a pilot-signal detecting circuit for use in the reproducing system shown in FIG. 4 according to another modification of the first embodiment.

FIG. 12 is a block diagram schematically showing still another example of the arrangement which can be used as the f1 and f2 detecting circuits 112 and 113 of FIG. 4 according to another modification of the first embodiment. In FIG. 12, identical reference numerals are used to denote constituent elements identical to those shown in FIG. 11.

Referring to FIG. 12, the output of the above-described switch 259 is supplied to an absolute-value detecting circuit 284. The absolute-value detecting circuit 284 detects the absolute values from the output components of the respective latch circuits 253 and 258. The components detected as the absolute values are extracted by the switch 286 and latched by latch circuits 288 and 289, respectively. The outputs of the latch circuits 288 and 289 are added together by an adder 245 to obtain a DC component. This DC component is passed through the digital low-pass filter 246 to eliminate noise components, and is then supplied to the terminal 207.

In the shown circuit, the digital low-pass filter 246 may be omitted for the purpose of a further cost reduction, except when it is necessary to obtain a DC component with a higher S/N ratio.

As is apparent from the above description, in the circuit of FIG. 12 as well, it is possible to digitally detect pilot signals, such as f1 and f2, similarly to the circuit of FIG. 11. In the circuit of FIG. 12, the absolute-value detecting circuit 284 is used for detecting the absolute values of both pilot signal components latched in two different phases. Accordingly, it is possible to make the entire circuit scale comparatively small similarly to the circuit of FIG. 11.

Figure 13:
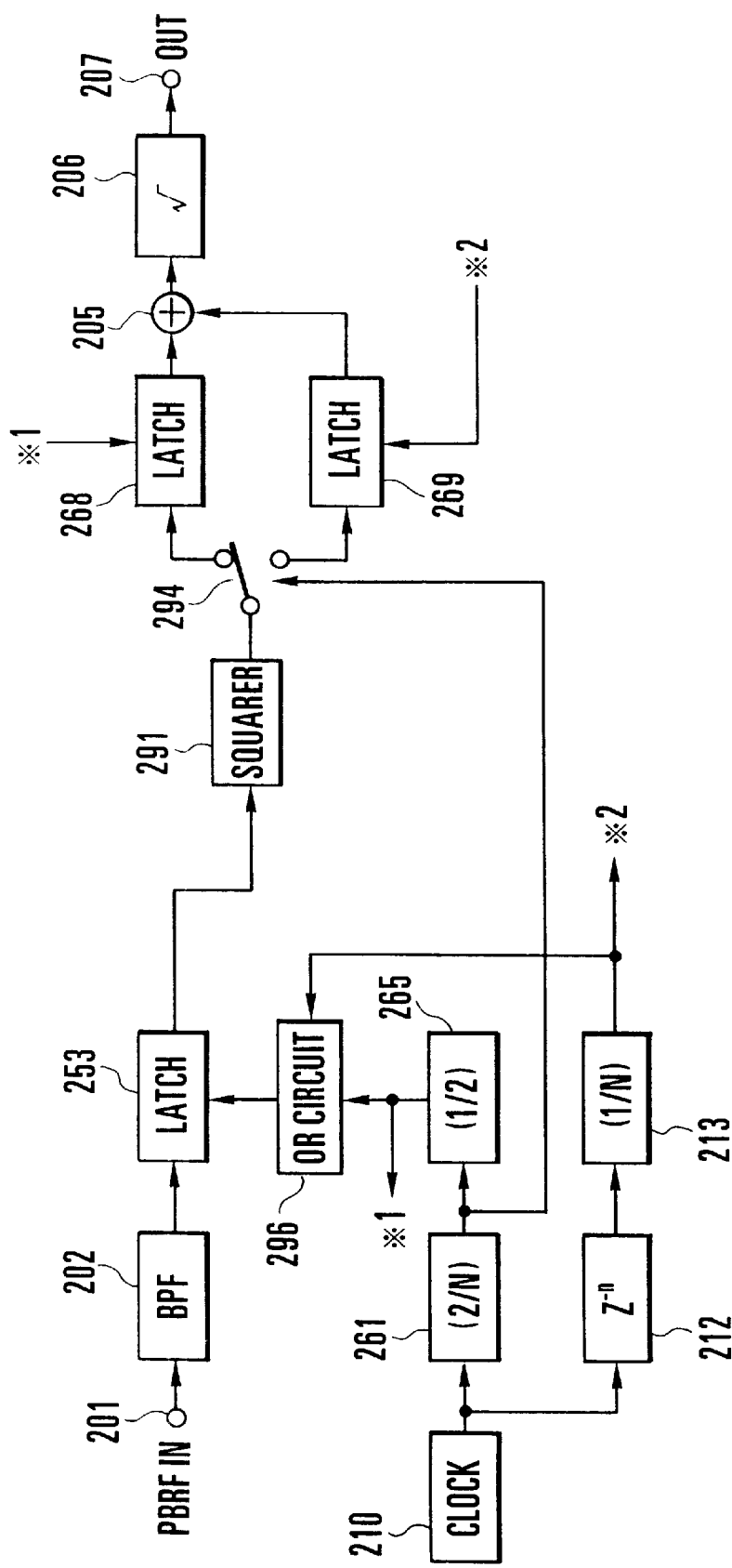
FIG. 13 is a block diagram schematically showing the construction of a pilot-signal detecting circuit for use in the reproducing system shown in FIG. 4 according to another modification of the first embodiment.

FIG. 13 is a block diagram schematically showing one example of the arrangement which can be applied to the f1 and f2 detecting circuits 112 and 113 of FIG. 11 according to another modification of the first embodiment. In FIG. 13, identical reference numerals are used to denote constituent elements identical to those shown in FIG. 11. Referring to FIG. 13, an OR circuit 296 carries out the logical OR between the clock outputted from the ½ frequency dividing circuit 265 and the clock outputted from the 1/N frequency dividing circuit 213, and the latch circuit 253 is operated in accordance with the logical sum of these clocks. Accordingly, the latch circuit 253 is provided but the latch circuit 258 is omitted. Of course, similarly to the example shown in FIG. 11, a squaring circuit 291 squares both pilot signal components latched in two different phases.

With the above-described arrangement, one latch circuit can be used to latch pilot signal components in two different phases. Accordingly, it is possible to further reduce the entire circuit scale and power consumption as compared with the example shown in FIG. 11.

As is apparent from the above description, according to the modifications shown in FIGS. 11 to 13, it is possible to construct a pilot-signal detecting device and a tracking control device both of which can be completely composed of digital circuits and are capable of executing nearly all processings by means of an MPU. In addition, since no analog circuit is employed, it is possible to reduce the practical size of the entire apparatus. Further, since one detecting circuit can be applied to pilot signal components decimated in two different phases, it is possible to reduce power consumption.

Furthermore, the detecting circuit, such as a squaring circuit or an absolute-value detecting circuit, can be incorporated into the MPU in the form of software. In this case, since complicated routines for detecting means can be prepared as routines common to the operating algorithms of the software, the capacity of a ROM can be reduced.

Figure 14:
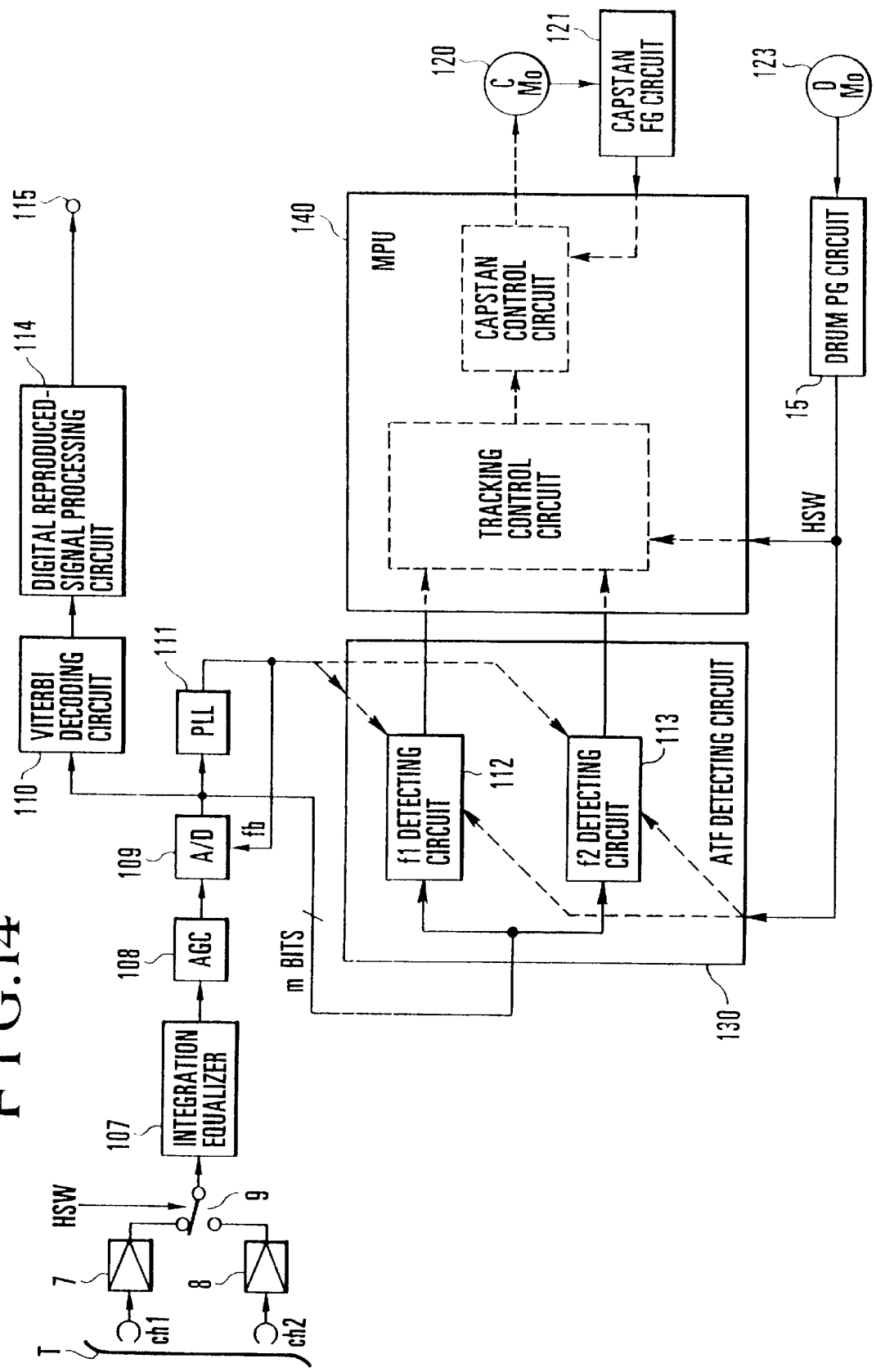
FIG. 14 is a block diagram schematically showing the entire construction of the reproducing system of a digital VTR according to a second embodiment of the present invention.

FIG. 14 is a block diagram schematically showing the construction of a reproducing system for a digital VTR according to a second embodiment of the present invention. In FIG. 14, identical reference numerals are used to denote constituent elements similar to those shown in FIG. 4.

The second embodiment differs from the embodiment of FIG. 4 in that the aforesaid PG pulse is inputted to not only the MPU 140 but also the ATF detecting circuit 130, thereby determining the timing of outputting the values of the frequencies f1 and f2.

Figure 15:
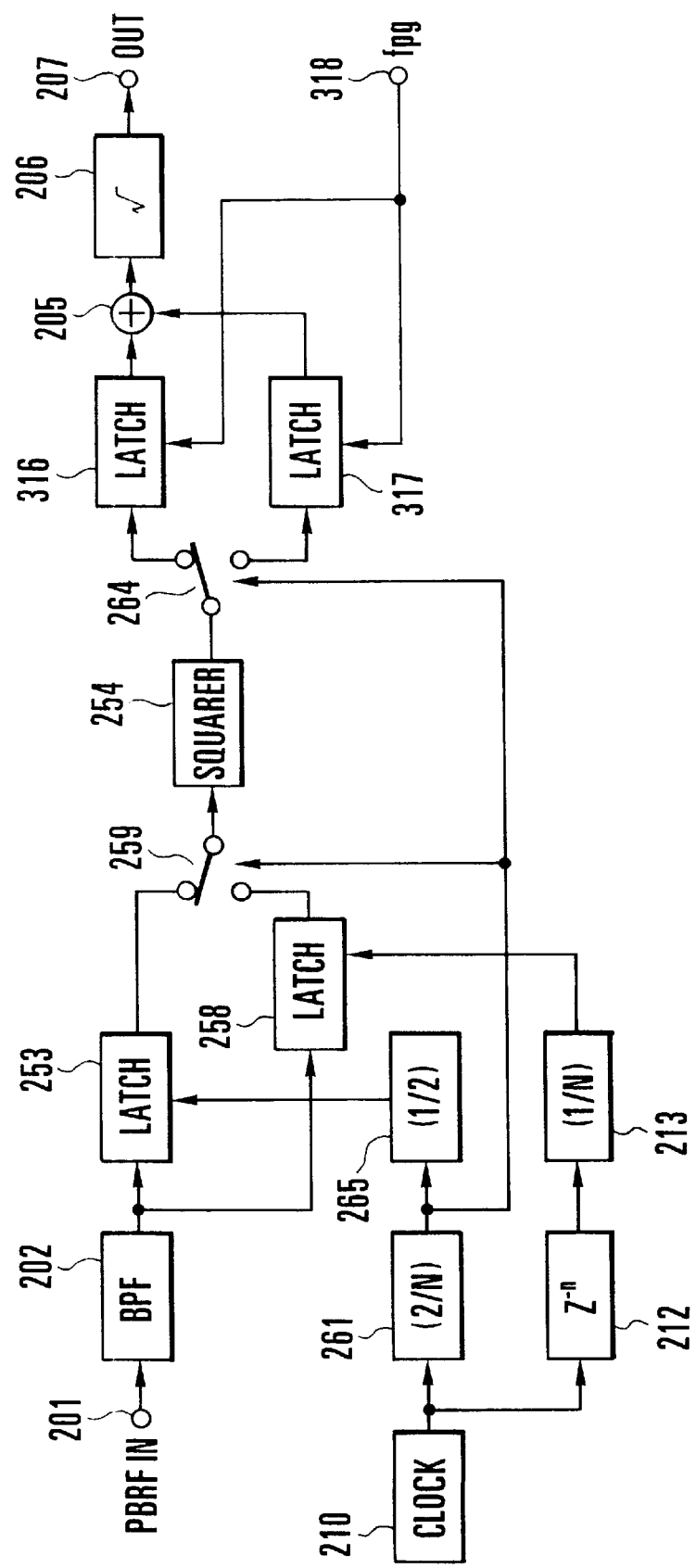
FIG. 15 is a block diagram schematically showing the construction of a pilot-signal detecting circuit for use in an reproducing system shown in FIG. 14 according to the second embodiment of the present invention.

A specific example of the construction of each of the f1 detecting circuit 112 and the f2 detecting circuit 113 shown in FIG. 14 will be described below. FIG. 15 is a block diagram schematically showing one example of the construction of a digital detecting circuit which can be used as the f1 or f2 detecting circuit 112 or 113 according to the second embodiment of the present invention. In FIG. 15, identical reference numerals are used to denote constituent elements similar to those shown in FIG. 11.

Figure 16A:
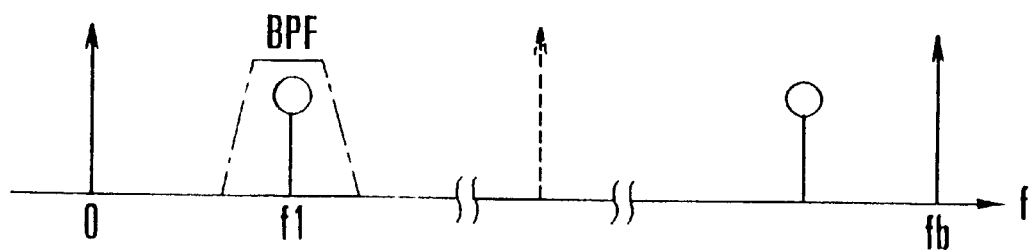
FIGS. 16(A), 16(B) and 16(C) are views showing the frequency bands of signals used in various parts of the pilot-signal detecting circuit shown in FIG. 15.

Referring to FIG. 15, a reproduced modulated signal which has been quantized at m bits per sample in the above-described manner is inputted to the digital band-pass filter (BPF) 202 through the input terminal 201. The BPF 202 extracts only a component of frequency f1 from the reproduced modulated signal as shown in FIG. 16(A). The reproduced modulated signal from which unwanted noise and the spectrum of the modulated digital bit stream data have been eliminated in this manner is inputted to the latch circuits 253 and 258 which are decimating means.

The clock of frequency fb outputted from the PLL circuit 111 is inputted from the clock generating circuit 210 and is then frequency-divided into a clock of frequency 2fb/N which is two times the frequency f1, by the 2/N frequency dividing circuit 261. The clock of frequency 2fb/N is frequency-divided into a clock of frequency f1 (fb/N) by the ½ frequency dividing circuit 265. In the example shown in FIG. 15, since the circuit of FIG. 14 is used for detecting the pilot signal component f1, a latch frequency for decimation is set to f1. If f1=fb/90 as described previously, the frequency-division ratio of the 1/N frequency dividing circuit 261 is 1/45.

Figure 16B:
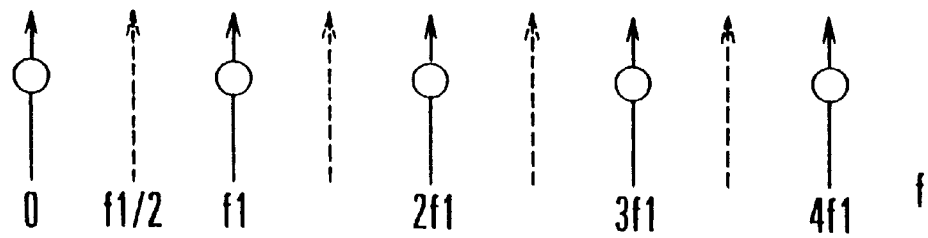

In the meantime, the clock of frequency fb inputted from the clock generating circuit 210 is supplied to the delay unit 212. The clock of frequency fb is delayed by a ¼ period of the frequency f1 (fb/90) by the delay unit 212, and the 1/N frequency divider 213 divides the frequency of the delayed clock by 90 to output a frequency-divided clock of frequency f1. Accordingly, the operational phases of the decimating circuits 253 and 258 differ from each other by the ¼ period of the frequency f1. In the second embodiment, by decimating the input pilot signal f1 by using phases having an orthogonal relationship (90°-shifted phases), spectra are detected in the form of being respectively folded at intervals of periods which are integer multiples of DC and f1, as shown in FIG. 16(B).

Since the latch circuits 253 and 258 perform decimation using clocks with an orthogonal relationship in the above-described manner, it is possible to obtain the amplitude of a particular frequency component of the input signal.

The outputs of the latch circuits 253 and 258 are switched by the switch 259 in synchronism with clocks supplied from the 2/N frequency dividing circuit 261, and the output of the switch 259 is inputted to the square detecting circuit 254. The output component of each of the latch circuits 253 and 258 which is outputted from the square detecting circuit 254 is similarly switched by and outputted from the switch 264 in synchronism with the clocks supplied from the 2/N frequency dividing circuit 261. This output of the switch 264 is latched by latch circuits 316 and 317 in accordance with, for example, the aforesaid ATF timing, in synchronism with a clock fpg according to the aforesaid PG pulse inputted through an terminal 318.

The outputs of the latch circuits 316 and 317 are inputted to the adder 205. Thus, the squares of the components latched by the respective latch circuits 253 and 258 are added together by the adder 205, and the sum output of the adder 205 is inputted to the square rooter 206. The square rooter 206 extracts a square root of the output of the adder 205, thereby finding the magnitude of the vector of the signal component f1. The output of the square rooter 206 is inputted to the MPU 140 through the terminal 207 as f1 value data.

Figure 16C:
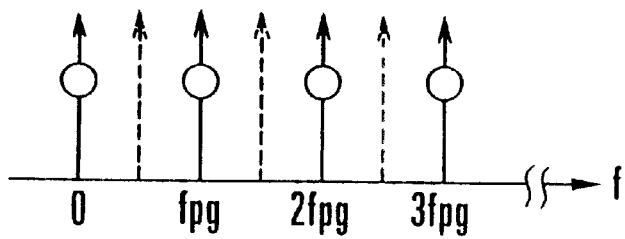

In the above-described manner, the decimating circuits 253 and 258 as well as the following circuits are operated in synchronism with the frequency-divided clocks for decimation. In addition, to allow for the case of inputting data to the MPU 140, the latch circuits 316 and 317 as well as the following circuits are operated in synchronism with the clock fpg synchronized with the ATF timing detected by the MPU 140. FIG. 16(c) is a view showing the frequency characteristics of the detection result outputted from the square rooter 206.

With the above-described arrangement, one squaring circuit, which has a comparatively large circuit scale, can be applied to pilot signal components latched (decimated) in two different phases. Accordingly, it is possible to make the entire circuit scale comparatively small. Operating timing for the latch circuits 316 and 317 as well as the following circuits is determined in terms of the operation of the MPU 140. Accordingly, although in the second embodiment the latch circuits 253 and 258 as well as the following circuits are constructed as hardware, equivalent functions can be easily incorporated into the software processing in the MPU 140 shown in the flowchart of FIG. 5.

The circuit of FIG. 15 can also be used for detecting the pilot signal component f2, similarly to the first embodiment.

Figure 17:
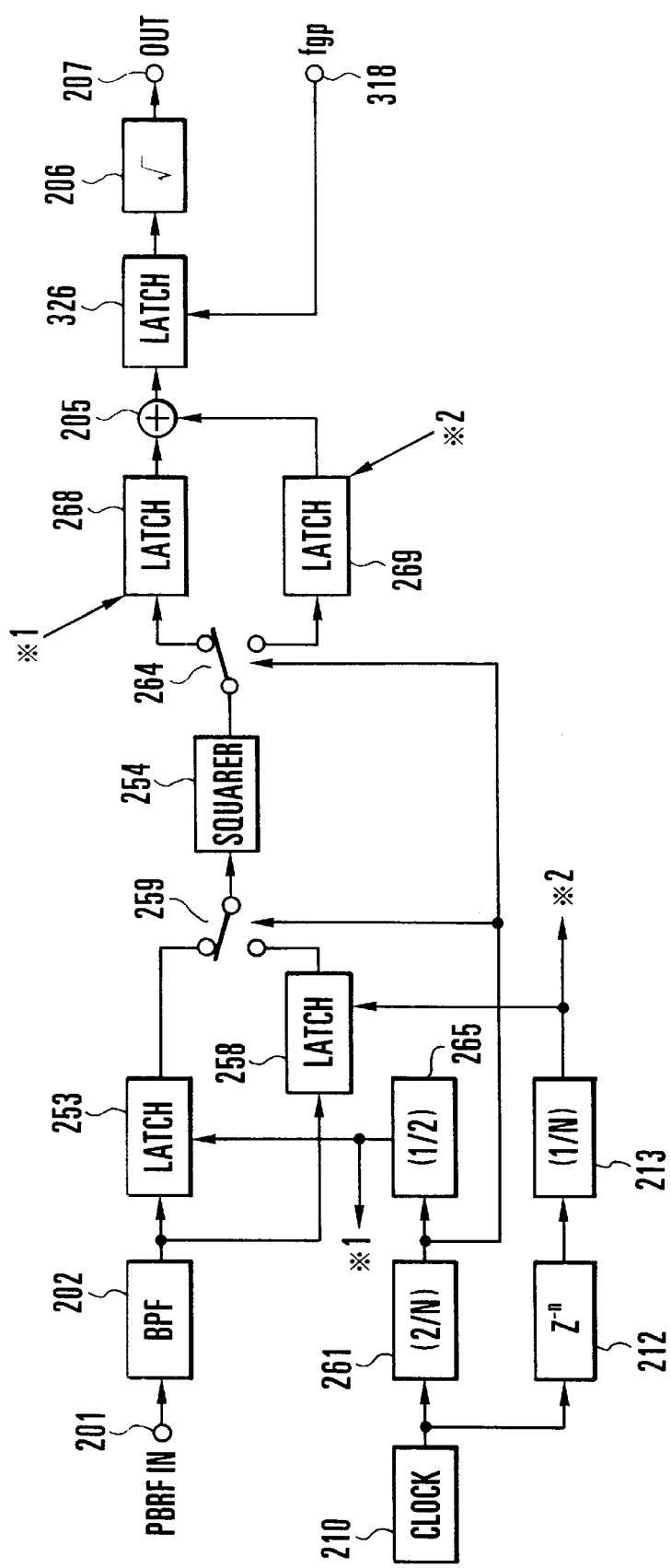
FIG. 17 is a block diagram schematically showing the construction of a pilot-signal detecting circuit for use in the reproducing system shown in FIG. 14 according to another modification of the second embodiment.

FIG. 17 is a block diagram schematically showing another example of an arrangement which can be applied to the f1 detecting circuit 112 and the f2 detecting circuit 113 of FIG. 14 according to another modification of the second embodiment. In FIG. 17, identical reference numerals are used to denote constituent elements identical to those shown in FIG. 15. In the example shown in FIG. 17, two outputs from the switch 264 are respectively latched by latch circuits 268 and 269 in synchronism with the clocks outputted from the frequency dividers 265 and 213, and the outputs of the latch circuits 268 and 269 are added together by the adder 205. The output of the adder 205 is latched by a latch circuit 326 in synchronism with the aforesaid clock fpg. In this manner, the detected component output synchronized with the aforesaid ATF timing is processed by the MPU 140 in accordance with the flowchart of FIG. 5.

As described above, in the circuit of FIG. 17 as well, similarly to the circuit of FIG. 15, pilot signals, such as f1 and f2, can be digitally detected and the timing of the detected-component outputs is made coincident with the operating timing of the MPU 140. The operation of the latch circuit 326 as well as that of the following circuits can be implemented as software.

Figure 18:
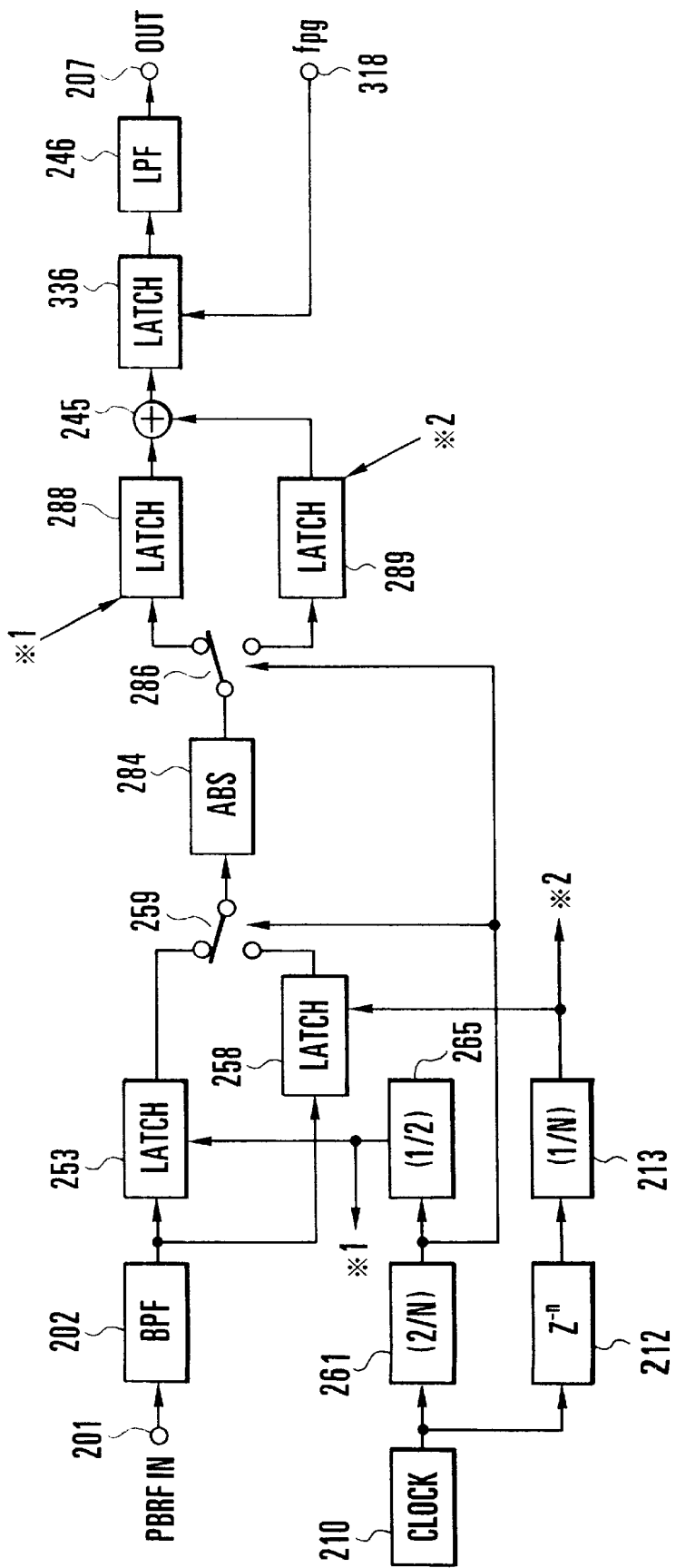
FIG. 18 is a block diagram schematically showing the construction of a pilot-signal detecting circuit for use in the reproducing system shown in FIG. 14 according to another modification of the second embodiment.

FIG. 18 is a block diagram schematically showing another example of an arrangement which can be applied to the f1 detecting circuit 112 and the f2 detecting circuit 113 of FIG. 14 according to another modification of the second embodiment. In FIG. 18, identical reference numerals are used to denote constituent elements identical to those shown in FIG. 15. In the example shown in FIG. 18, the output of the above-described switch 259 is supplied to the absolute-value detecting circuit 284. The absolute-value detecting circuit 284 detects the absolute values from the output components of the respective latch circuits 253 and 258. The components detected as the absolute values are extracted by the switch 286 and latched by the latch circuits 288 and 289, respectively. The outputs of the latch circuits 288 and 289 are added together by the adder 245 to obtain a DC component. This DC component is further latched by a latch circuit 336 in synchronism with the clock fpg, whereby the timing of the DC component is made coincident with the AFT timing. This DC component is passed through the digital low-pass filter 246 to eliminate noise components, and is then supplied to the terminal 207. In the shown circuit, the digital low-pass filter 246 may be omitted for the purpose of a further cost reduction, except when it is necessary to obtain a DC component with a higher S/N ratio.

As is apparent from the above description, according to the embodiments shown in FIGS. 15 to 18, it is possible to construct a pilot-signal detecting device and a tracking control device both of which can be completely composed of digital circuits and are capable of executing nearly all processings by means of an MPU. In addition, since no analog circuit is employed, it is possible to reduce the practical size of the entire apparatus and also to improve the compatibility of the apparatus with other digital equipment. Further, since one detecting circuit can be applied to pilot signal components decimated in two different phases, it is possible to reduce power consumption.

Furthermore, part of the detecting circuit, i.e., the latch circuits 316, 317, 326 and 336 as well as the following circuits, can be incorporated into the MPU in the form of software. In this case, since the operating period of the software is an extremely extended period according to the clock fpg, the capacity of a ROM can be reduced to a great extent.

As is apparent from the above-described embodiments, in the case of detecting a pilot signal component of predetermined frequency from a modulated digital signal, the level of the pilot signal component is detected from the output of digital conversion means for bit-quantizing the modulated digital signal, and the detected-component output of the detecting means is sampled by sampling means in synchronism with a clock of frequency corresponding to the operating frequency of reproducing means. Accordingly, it is possible to accurately detect the pilot signal multiplexed with the modulated digital signal, only by a digital signal processing circuit. In addition, since the operations of the sampling means and the following circuits are performed at an operating frequency synchronized with the operating frequency of the reproducing means, such operations can be processed by using software and, further, a burden to the software can be made extremely small.

What is claimed is:

1. A signal detecting device for detecting a pilot signal component from a modulated digital signal which contains binary information serially by bit and a pilot signal component, comprising:

clock generating means for generating a clock which synchronizes with the modulated digital signal, the clock having a frequency that is sufficiently higher than a frequency of the pilot signal component;

converting means for converting the modulated digital signal into a digital data stream including a plurality of bits corresponding to each one-bit of the binary information;

restoring means for restoring the plurality of bits obtained from said converting means to the one-bit of the binary information;

reducing means for reducing an amount of data of the digital data stream converted by said converting means; and detecting means for detecting the pilot signal component by using the output of said reducing means, wherein the digital data stream converted by said converting means is commonly utilized for restoring the binary information and for detecting the pilot signal component.

2. A signal detecting device according to claim 1, wherein said restoring means includes a Viterbi decoder for restoring the binary data by using the data stream.

3. A signal detecting device according to claim 1, wherein said reducing means includes subsampling means for extracting one of the plurality of bits included in the data stream among a plurality of the plurality of bits.

4. A signal detecting device according to claim 3, wherein said subsampling means subsamples the data stream in accordance with a subsampling clock having a frequency related to the frequency of the pilot signal component.

5. A signal detecting device according to claim 4, wherein the modulated digital signal contains a plurality of kinds of pilot signal components each having a different frequency from each other, the frequency of the subsampling clock being a frequency which is one divided by an integer of the frequency of any of the plurality of kinds of pilot signal components.

6. A signal detecting device according to claim 1, further comprising reproducing means for reproducing the modulated digital signal from a magnetic recording medium.

7. A signal detecting device according to claim 6, further comprising sampling means for sampling an output of said detecting means in accordance with a clock having a frequency corresponding to an operating frequency of said reproducing means.

8. A signal detecting device according to claim 6, further comprising controlling means for controlling a relative position between said reproducing means and the recording medium.

9. A signal detecting method for detecting a pilot signal component from a modulated digital signal which contains binary information serially by bit and a pilot signal component, comprising the steps of:

generating a clock which synchronizes with the modulated digital signal, the clock having a frequency that is sufficiently higher than a frequency of the pilot signal component;

converting the modulated digital signal into a digital data stream including a plurality of bits corresponding to each one-bit of the binary information;

restoring the plurality of bits obtained in said converting step to the one-bit of the binary information;

reducing an amount of data of the digital data stream converted in said converting step to generate a reduced data stream; and detecting the pilot signal component by using the reduced data stream obtained in said reducing step, wherein the digital data stream converted in said converting step is commonly utilized for restoring the binary information and for detecting the pilot signal component.

10. A signal detecting method according to claim 9, wherein said restoring step performs Viterbi decoding to restore the binary data by using the data stream.

11. A signal detecting method according to claim 9, wherein said reducing step includes a subsampling step for extracting one of the plurality of bits included in the data stream among a plurality of the plurality of bits.

12. A signal detecting method according to claim 11, wherein the data stream is subsampled in accordance with a subsampling clock having a frequency related to the frequency of the pilot signal component in said subsampling step.

13. A signal detecting method according to claim 12, wherein the modulated digital signal contains a plurality of kinds of pilot signal components each having a different frequency from each other, the frequency of the subsampling clock being a frequency which is one divided by an integer of the frequency of any of the plurality of kinds of pilot signal components.

14. A reproducing apparatus for reproducing binary information from a modulated digital signal which contains binary information serially by bit and a pilot signal component, comprising:

reproducing means for reproducing the modulated digital signal from a recording medium;

clock generating means for generating a clock which synchronizes with the modulated digital signal, the clock having a frequency that is sufficiently higher than a frequency of the pilot signal component;

converting means for converting the modulated digital signal reproduced by said reproducing means into a digital data stream including a plurality of bits corresponding to each one-bit of the binary information;

restoring means for restoring the plurality of bits obtained by said converting means to the one-bit of the binary information;

reducing means for reducing an amount of the digital data stream converted by said converting means; and control means for controlling a relative position of said reproducing means and the recording medium, wherein the digital data stream converted by said converting means is commonly utilized for restoring the binary information and for controlling the relative position of said reproducing means and the recording medium.

15. A reproducing apparatus according to claim 14, wherein said restoring means includes Viterbi decoder for restoring the binary data by using the data stream.

* * * * *

UNITED STATES PATENT AND TRADEMARK OFFICE
CERTIFICATE OF CORRECTION

PATENT NO. : 6,271,981 B1
DATED : August 7, 2001
INVENTOR(S) : Shinichi Hatae

It is certified that error appears in the above-identified patent and that said Letters Patent is hereby corrected as shown below:

<u>Column 9,</u>
Line 41, delete "is to obtain" and insert -- is converted to obtain --.

Signed and Sealed this

Thirtieth Day of April, 2002

Attest:

JAMES E. ROGAN
*Director of the United States Patent and Trademark Office*

*Attesting Officer*